(12) United States Patent
Morariu et al.

(10) Patent No.: US 11,829,230 B2
(45) Date of Patent: Nov. 28, 2023

(54) GLOBALLY UNIQUE ERROR CODES FOR KNOWLEDGE DOCUMENT INDEXING IN SOFTWARE SYSTEMS

(71) Applicant: International Business Machines Corporation, Armonk, NY (US)

(72) Inventors: Cristina Morariu, Cluj-Napoca (RO); Faried Abrahams, Laytonsville, MD (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 17/482,617

(22) Filed: Sep. 23, 2021

(65) Prior Publication Data

US 2023/0086619 A1   Mar. 23, 2023

(51) Int. Cl.
| | | |
|---|---|---|
| *G06F 11/00* | (2006.01) | |
| *G06F 11/07* | (2006.01) | |
| *G06F 11/36* | (2006.01) | |
| *G06F 16/93* | (2019.01) | |

(52) U.S. Cl.
CPC ...... *G06F 11/0775* (2013.01); *G06F 11/0787* (2013.01); *G06F 11/3688* (2013.01); *G06F 16/93* (2019.01)

(58) Field of Classification Search
CPC ............. G06F 11/0775; G06F 11/0787; G06F 11/3688; G06F 16/93
See application file for complete search history.

(56) References Cited

U.S. PATENT DOCUMENTS

| | | | |
|---|---|---|---|
| 7,987,390 B2 | 7/2011 | Chandrasekaran | |
| 9,665,467 B2 | 5/2017 | Angwin et al. | |
| 10,649,882 B2* | 5/2020 | Li | G06F 11/008 |
| 10,917,520 B1* | 2/2021 | T. G | H04M 3/5233 |
| 2004/0153833 A1* | 8/2004 | Deacon | G06F 11/0727 714/38.14 |
| 2011/0107137 A1* | 5/2011 | Lam | G06F 11/0793 714/E11.023 |

(Continued)

OTHER PUBLICATIONS

IPCOM000233569D, "Coordinated error reporting across multiple components using self-describing (XML) document", Dec. 15, 2013, 4 pages.

(Continued)

*Primary Examiner* — Joshua P Lottich
(74) *Attorney, Agent, or Firm* — Daniel Yeates; Hunter E. Webb; Keohane & D'Alessandro, PLLC

(57) ABSTRACT

Disclosed embodiments provide techniques for generating and using a Global Error-Code Sequence (GECS), with the role of generating, at request, a unique error identification number (ID). The scope of the unique identification number can include worldwide, company-wide, or a certain application ecosystem, such as eCommerce applications, etc. The GECS forms a strong correlation between an error condition and a known solution. While other logging signatures such as line numbers, stack traces, and addresses can change with new releases or invocations, the GECS enables a tighter coupling between an error condition and a knowledgebase document, which enables faster resolution of computer application problems and reduced downtime.

17 Claims, 13 Drawing Sheets

(56) References Cited

U.S. PATENT DOCUMENTS

| | | | | |
|---|---|---|---|---|
| 2011/0264964 A1* | 10/2011 | Murphy | .............. | G06F 11/0766 |
| | | | | 714/48 |
| 2014/0173350 A1* | 6/2014 | Roy | ................... | G06F 11/0787 |
| | | | | 714/37 |
| 2016/0210133 A1* | 7/2016 | Lee | ....................... | G06F 21/572 |
| 2017/0161138 A1* | 6/2017 | Oleynikov | .............. | H04L 69/40 |
| 2019/0102243 A1* | 4/2019 | Thompson | .......... | G06F 21/6245 |
| 2020/0174873 A1* | 6/2020 | Toupal | ................ | G06F 13/4063 |
| 2020/0201744 A1* | 6/2020 | Ho | ...................... | G06F 11/3696 |

OTHER PUBLICATIONS

Manujith Pallewatte, "Centralized Error Handing with React and Redux", Jan. 23, 2020, 18 pages.

Nylander-Hill et al., IPCOM000114148D, "Automated Error Code Database for Microcode Generation", Nov. 1, 1994, 5 pages.

Neil Manvar, "Trace Errors Through Your Stack Using Unique Identifiers in Sentry", Apr. 4, 2019, 8 pages.

\* cited by examiner

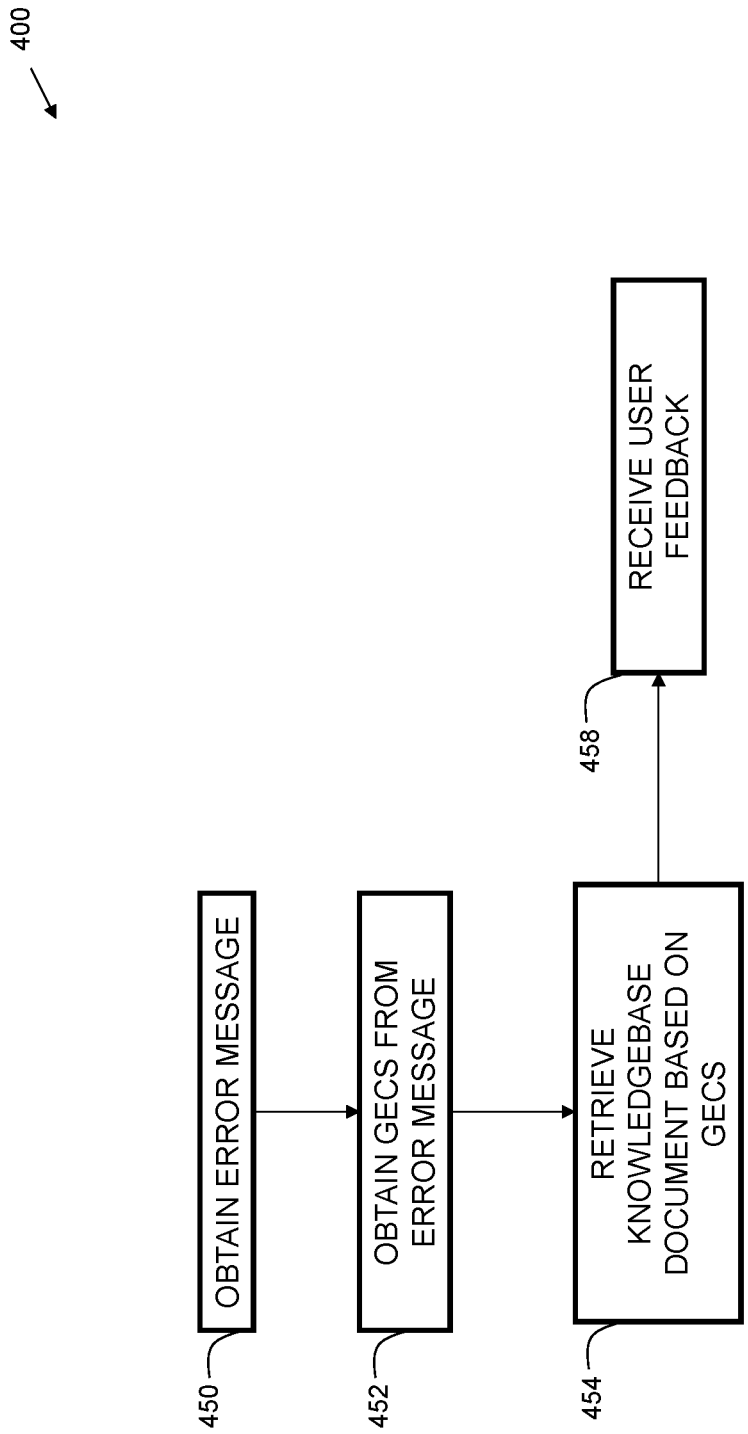

```
File  Edit  Search  View  Tools  Plugins  Window          — ☐ ✕

1  #include<stdio.h>
 2  int get_calibration_file()
 3  {
 4      char fname[20], str[500];
 5      FILE *fp;
 6      printf("Enter the Name of File: ");
 7      gets(fname);
 8      fp = fopen(fname, "r");
 9      if(fp==NULL)
10          printf("Error opening file:"      ← 604
11      else
12      {
13          fscanf(fp, "%[^\0]", str);
14          printf("\nFile Read Operation Performed Successfully!");
15      }
16          fclose(fp);
17      getch();
18      return 0;
19  }
```

Right-click to obtain GECS

FIG. 6A

```
File   Edit   Search   View   Tools   Plugins   Window              — ☐ ✕

1  #include<stdio.h>
 2  int get_calibration_file()
 3  {
 4      char fname[20], str[500];
 5      FILE *fp;
 6      printf("Enter the Name of File: ");
 7      gets(fname);
 8      fp = fopen(fname, "r");
 9      if(fp==NULL)
10          printf("Error opening file: Err-20TZ-5679-1BQ8-3948");
11          /* Err-2093-5679-1928-3948 ENTER YOUR COMMENT HERE*/
12      else
13      {
14          fscanf(fp, "%[^\0]", str);
15          printf("\nFile Read Operation Performed Successfully!");
16      }
17          fclose(fp);
18      getch();
19      return 0;
20  }
```

FIG. 6B

```
File   Edit   Search   View   Tools   Plugins   Window              — ☐ ✕

1   #include<stdio.h>
2   int get_calibration_file()
3   {
4       char fname[20], str[500];
5       FILE *fp;
6       printf("Enter the Name of File: ");
7       gets(fname);
8       fp = fopen(fname, "r");
9       if(fp==NULL)
10          printf("Error opening file: Err-20TZ-5679-1BQ8-3948");
11          /* Err-2093-5679-1928-3948 if calibration file is missing, the
12      import module may not be running*/
13      else
14      {
15          fscanf(fp, "%[^\0]", str);
16          printf("\nFile Read Operation Performed Successfully!");
17      }
18          fclose(fp);
19      getch();
20      return 0;
21  }
```

FIG. 6C

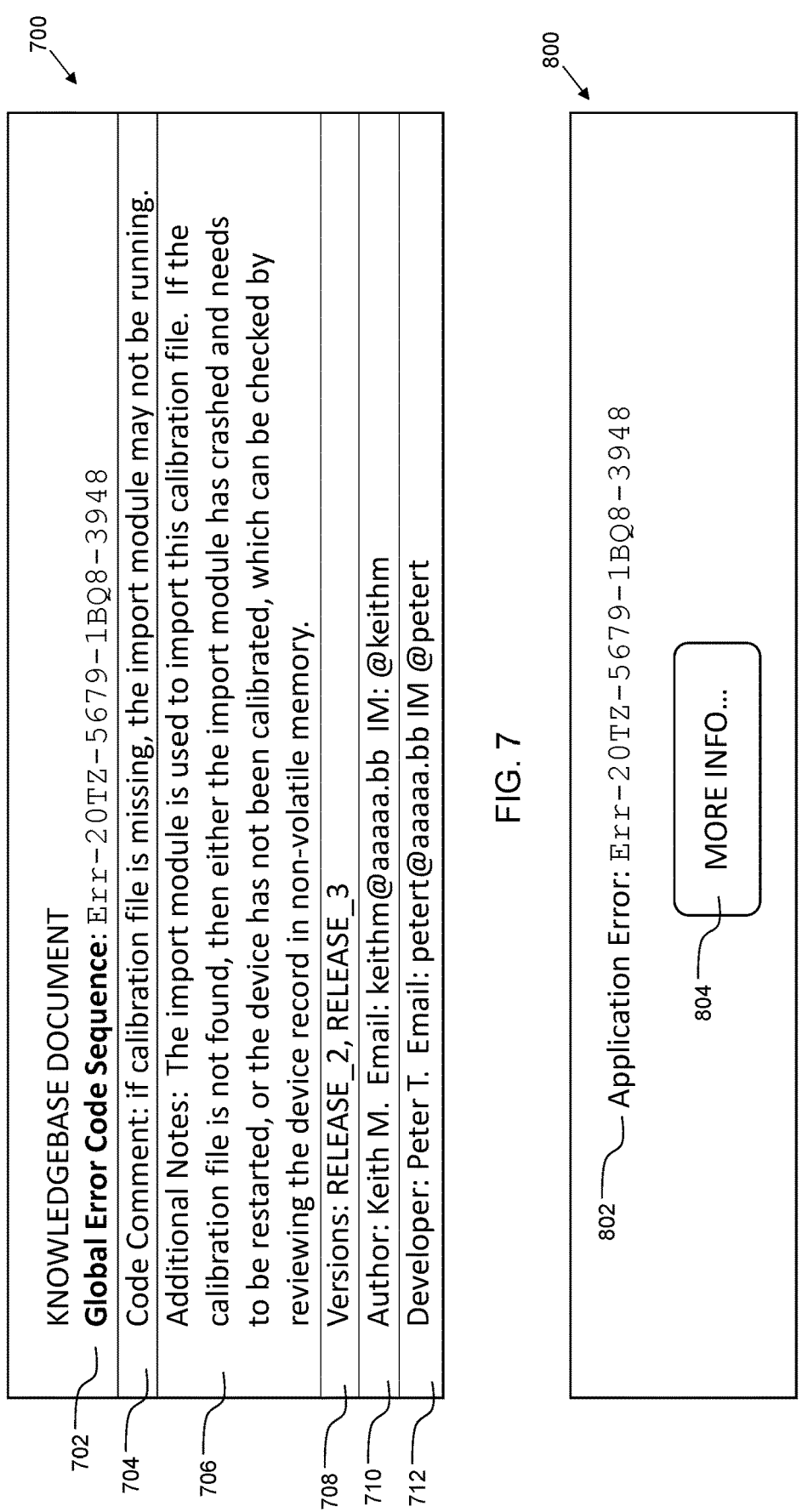

```
House.java
    ...
    paint(){
10      try{
        ...
14          PaintColor();
15      } catch NoPaintException e {            ─ 905
            log ("Err" + Err-123456789 + e);
            // smart commenting so that knowledge article is created for the new
            error code
        ...
20      } catch NoColorException e {
21          log (e);
        }
    ...
    }
```

```
20200302 18:38:13.520 DEBUG    remoteApp.log.app.ServiceA-   House Main Enter
20200302 18:38:13.871 ERROR    remoteApp.log.app.ServiceA-
NoColorException....House.java: line 21
```

FIG. 10A

```
20200302 18:38:13.520 DEBUG    remoteApp.log.app.ServiceA-   House Main Enter
20200302 18:38:13.871 ERROR    remoteApp.log.app.ServiceA-
NoColorException....House.java: line 26
```

FIG. 10B

```
20200302 18:38:13.520 DEBUG    remoteApp.log.app.ServiceA-   House Main Enter
20200302 18:38:13.871 ERROR    remoteApp.log.app.ServiceA-
NoPaintException....House.java: Err-123456789 line 15
```

FIG. 10C

```
20200302 18:38:13.520 DEBUG    remoteApp.log.app.ServiceA-   House Main Enter
20200302 18:38:13.871 ERROR    remoteApp.log.app.ServiceA-
NoPaintException....House.java: Err-123456789 line 33
```

FIG. 10D

GLOBALLY UNIQUE ERROR CODES FOR KNOWLEDGE DOCUMENT INDEXING IN SOFTWARE SYSTEMS

FIELD

The present invention relates generally to software development, and more particularly, to globally unique error codes for knowledge document indexing in software systems.

BACKGROUND

Typical software development cycles can be rapid. Agile development techniques and continuous integration development models can result in a dynamic code base, where applications are frequently updated based on reported defects, as well as new feature deployment.

Modern computing systems and applications generate vast amounts of data resulting from the operation of those computing systems and applications. In some cases, hundreds of megabytes of diagnostic output, in the form of various log files, may be generated. These vast amounts of data are stored in designated locations, such as log files/records, which can then be used for investigative purposes in the event of an error or failure in the operation of the system or application.

Enterprise and cloud-based systems are examples of large-scale systems that include a large set of components and software. Such systems often demand high availability, with minimum interruption and downtime to repair problems.

Although computer systems typically collect logs that can help with diagnosis, any given computer system may generate a tremendous number of logs, including normal records and event records that correspond to software/component failures. With the dynamic nature of modern software development, the signatures of software/component failures can change rapidly, creating additional challenges to the development, deployment, and maintenance of such systems.

SUMMARY

In one embodiment, there is provided a computer-implemented method comprising: receiving a request for a unique error code from a remote computing device; generating a new unique error code; transmitting the new unique error code to the remote computing device; and automatically generating a document in a knowledge management system corresponding to the new unique error code.

In another embodiment, there is provided an electronic computation device comprising: a processor; a memory coupled to the processor, the memory containing instructions, that when executed by the processor, cause the electronic computation device to: receive a request for a unique error code from a remote computing device; generate a new unique error code; transmit the new unique error code to the remote computing device; and automatically generate a document in a knowledge management system corresponding to the new unique error code.

In yet another embodiment, there is provided a computer program product for an electronic computation device comprising a computer readable storage medium having program instructions embodied therewith, the program instructions executable by a processor to cause the electronic computation device to: receive a request for a unique error code from a remote computing device; generate a new unique error code; transmit the new unique error code to the remote computing device; and automatically generate a document in a knowledge management system corresponding to the new unique error code.

BRIEF DESCRIPTION OF THE DRAWINGS

FIG. 4 is a flowchart indicating additional process steps for embodiments of the present invention.

FIG. 6A shows an integrated development environment (IDE) in the process of obtaining a global error code sequence (GECS).

FIG. 6B shows an integrated development environment (IDE) after insertion of the global error code sequence (GECS) into software source code.

FIG. 6C shows an integrated development environment (IDE) after completion of comments for the global error code sequence (GECS) in the software source code.

FIG. 7 is a knowledgebase document in accordance with embodiments of the present invention.

FIG. 8 is an error message from an application in accordance with embodiments of the present invention.

FIG. 9 is a java code example in accordance with embodiments of the present invention.

FIG. 10A is a first logging example.

FIG. 10B is a second logging example.

FIG. 10C is a logging example utilizing embodiments of the present invention.

FIG. 10D is another logging example utilizing embodiments of the present invention.

Figure 1:
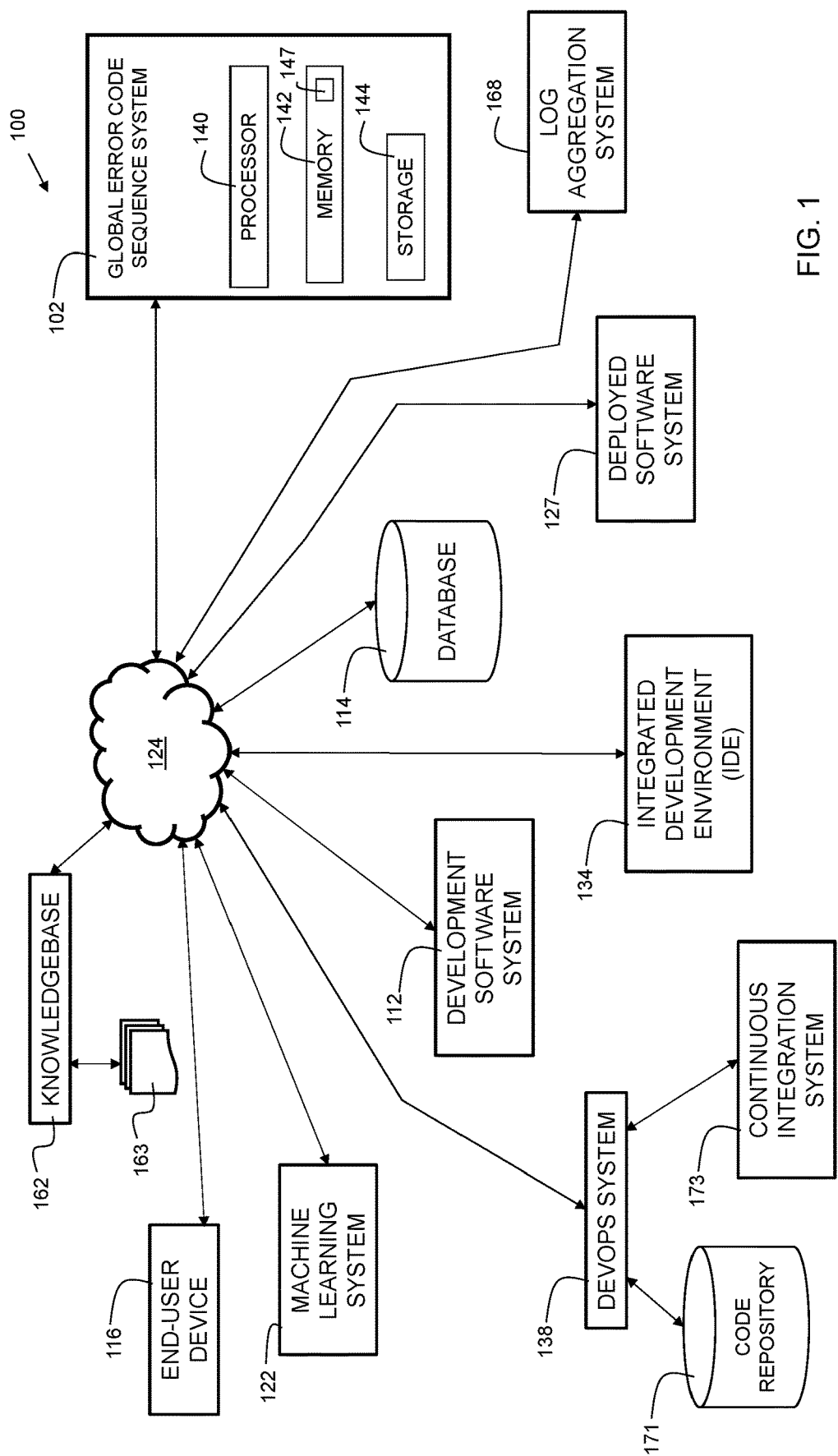
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for improved software development and support. Knowledge management systems (knowledgebases) are key to any software product lifecycle in both cloud and on-premise embodiments, as it enables smooth delivery of the functionality to the end users. The knowledgebase typically includes a set of knowledgebase documents that document procedures to be followed to remediate and prevent service degradation. In practice, the knowledgebase supporting a software product is dynamic in nature, being constantly updated to reflect changes and new features introduced in the software product. The effectiveness of such a knowledgebase is given by the quality of the knowledgebase documents and the ability of the support engineers and customers to find the relevant knowledgebase document for the problem at hand. Therefore, a strong correlation between the software source code and the knowledgebase documents is useful for improving operational efficiency of complex computer systems by resolving technical issues quickly, thereby reducing downtime.

Disclosed embodiments provide techniques to introduce a structured indexing for knowledgebase documents that can be implemented in an additive fashion on top of current error logging practices. Disclosed embodiments provide a core functionality that can be used to build further automation and intelligent flows for knowledge area in close relation to software code changes. Similarly, robot process automation (RPA) techniques can be employed to automatically propagate changes between related knowledgebase documents when certain events are detected. The main benefit of disclosed embodiments is the reduced maintenance requirements of the knowledgebase, as document indexing becomes tolerant to software updates and patches. This translates directly in cost savings as less work is required in the knowledge management area and increases customer satisfaction due to better and more precise correlation of search results.

Error conditions encountered by software systems at runtime are typically recorded in log files, which are in turn analyzed by engineers using a variety of tools. Companies build knowledgebase systems for their products that document common error conditions and their possible solutions. These knowledgebase systems are used by support engineers to triage and resolve issues reported by end users of the software systems. An efficient correlation between the source code execution and the knowledge document that contains the relevant solution is key for implementing fast solutions and achieving customer satisfaction.

A common problem of current implementations is the weak link between the code that generates the error in the log and the knowledgebase document that describes the cause and solution. Disclosed embodiments introduce a structured mechanism to bridge the gap between the code and knowledgebase (knowledge system) by using globally unique error codes. Disclosed embodiments provide services that are queried at development time and assign unique error codes to developers, that correlate to knowledgebase documents. In this way, using disclosed embodiments, the knowledge management system search functionality can use these unique error codes to efficiently identify the correct knowledgebase document for a given issue.

Disclosed embodiments provide techniques for generating and using a Global Error-Code Sequence (GECS), with the role of generating, at request, a unique error identification number (ID). The scope of the unique identification number can include worldwide, company-wide, or a certain application ecosystem, such as eCommerce applications, etc. The GECS forms a strong correlation between an error condition and a known solution. While other logging signatures such as line numbers, stack traces, and addresses can change with new releases or invocations, the GECS enables a tighter coupling between an error condition and a knowledgebase document, which enables faster resolution of computer application problems and reduced downtime.

Software developers use this service when introducing a new error message in the code. In embodiments, this process is automated at the Integrated Development Environment (IDE) level for convenience and completeness. In some embodiments, a plugin installed in the IDE coordinates the obtaining and inserting of the GECS in source code, as well as the update of relevant technical information to a knowledgebase based on the GECS. Thus, disclosed embodiments establish a strong link between the error condition and the error ID in the log. The knowledgebase documents (articles) can then be indexed on the unique error ID, thereby creating a strong link between the error condition and the knowledgebase documents. This provides a more robust and easier to maintain system and reduces support cost while increasing the efficiency. The implementation costs are minimum and do not affect current practices which makes it easy to be adopted. Furthermore, the unique error codes provide a consistent base for implementing robot process automation (RPA) techniques to automatically maintain the knowledgebase at scale.

In embodiments, the Global Error-Code Sequence is implemented as a set of synchronized representational state transfer (REST) endpoints that offer atomic operations used by developers to retrieve a unique error code. A highly available database system can be used to provide the sequence storage functionality and serve as a repository for the error code metadata. The system guarantees that every GECS that is issued is unique.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 shows an environment 100 for embodiments of the present invention. Global Error Code Sequence (GECS) system 102 comprises a processor 140, a memory 142 coupled to the processor 140, and storage 144. System 102 is an electronic computation device. The memory 142 contains instructions 147, that when executed by the processor 140, perform processes, techniques, and implementations of disclosed embodiments. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs). The GECS system 102 is configured to interact with other elements of environment 100 in order to generate and utilize global error code sequences. The global error code sequences are used to link logged events from software applications to relevant knowledgebase documents. This enables engineers, technicians, and other stakeholders to quickly diagnose and resolve issues of a complex computer system. System 102 is connected to network 124, which is the Internet, a wide area network, a local area network, or other suitable network.

DevOps system 138 is part of the environment 100. This system can include a continuous integration system 173 such as Jenkins or other suitable tool, and a code repository 171, which may be implemented using git, cvs, svn, or other suitable repository management tool. Additional components may include a defect tracking system such as Jira®, or other suitable defect tracking tool, a code collaboration tool such as Gerrit, and/or a code distribution tool to push upgrades to test environments such as development software system 112, as well as deployed environments such as deployed software system 127.

Log aggregation system 168 collects logs from devices and/or applications executing test and/or deployed software. The log aggregation system 168 may store logs as well as perform some processing functions on the logs. The computing devices within each test and/or deployment environment generate log files. Log files are typically text-based files that contain information about the operation of the device and/or application. Warnings, errors, and other unexpected conditions are typically written to one or more log files. The computing devices within the deployments then typically upload the log files to the log aggregation system 168 on a regular basis. On the log aggregation system 168, certain text strings and/or patterns, referred to as "markers", are identified as indicative of an error or other problem warranting investigation. In disclosed embodiments, each GECS, due to its unique nature, may serve as a marker. The information in the log file associated with the marker is further parsed to obtain additional information about the error or incident. The log aggregation system 168 may include or interface with log processing tools such as Splunk, Loggly, or other suitable tools. The GECS system 102 creates unique codes that are included in logs that are collected by log aggregation system 168.

Integrated Development Environment (IDE) 134 is part of the environment 100. In embodiments, the IDE communicates with the GECS system 102 via network 124. In some embodiments, as a software developer writes or edits software code, the developer can request a new GECS via the IDE. In one embodiment, when the developer places a cursor over an error processing block such as a catch block, or if statement, the IDE provides an option to request a GECS. When the option is invoked, the IDE issues an API such as an HTTP GET to the GECS system 102 and inserts the GECS into the source code at the desired location. By making the GECS insertion process seamless for developers, it increases the likelihood that meaningful and effective error reporting is linked to a knowledgebase document. In embodiments, the IDE 134 may execute on a desktop computer, laptop computer, tablet computer, virtual machine, containerized application, remote computing device, or other suitable computing device.

In some embodiments, machine learning system 122 is part of the environment 100. In embodiments, the machine learning system 122 is configured to perform classification and/or pattern recognition on logs and/or knowledgebase documents in order to further correlate error codes and knowledgebase documents. Semantic analysis and natural language processing may also be used to further analyze knowledgebase documents.

The machine learning system 122 may include one or more computers operating to perform analysis on log files and/or knowledgebase documents. The machine learning system 122 may include a neural network, convolutional neural network (CNN), Decision Trees, Random Forests, clustering, hierarchical clustering, k-means, and/or any other supervised learning techniques, unsupervised learning techniques, or a combination of both supervised and unsupervised learning techniques. In embodiments, TensorFlow or other suitable frameworks may be used in the implementation of machine learning system 122.

Database 114 is part of the environment 100. The database 114 may be configured to data structures pertaining to issued GECSs. The data structures can include details about the GECS, such as developers, code branches, software releases, defect tickets associated with the software code that contains the GECS, and/or other relevant information. In some embodiments, the database may include a structured query language (SQL) database such as MySQL.

Deployed software system 127 is part of the environment 100. The deployed software system 127 may be a production system or other "live" system used by customers. Development software system 112 is part of the environment 100. This system may be used as a testing environment for a software product and/or service. In some embodiments, as part of a DevOps pipeline process, software is tested on the development software system 112. In a general DevOps process, software is thoroughly tested on the development software system 112 before being deployed to deployed software system 127. When the software is deemed to work satisfactorily (e.g., passing a certain number and/or percentage of test cases), it may then be pushed to the deployed software system 127.

End-user device 116 is part of the environment 100. The end-user device is a client device. The end-user device 116 is an electronic computing device. The end-user device 116 is used to interact with the deployed software system 127. In embodiments, the deployed software system 127 may return a GECS to the end-user device upon encountering a software error. In some embodiments, the GECS may be embedded in an HTML page that includes a link to access the associated knowledgebase document from knowledgebase 162, in order to perform functions of disclosed embodiments. In embodiments, the end-user device 116 can be a desktop computer, laptop computer, tablet computer, or other suitable device.

Knowledgebase 162 is part of the environment 100. This system includes numerous documents, indicated at 163, that contain knowledge and/or information regarding the deployed software. The information can include a GECS, and corresponding symptoms, workarounds, known issues, defect ticket numbers, software version information, configuration recommendations, and other technical advice pertaining to a specific GECS.

Figure 2:
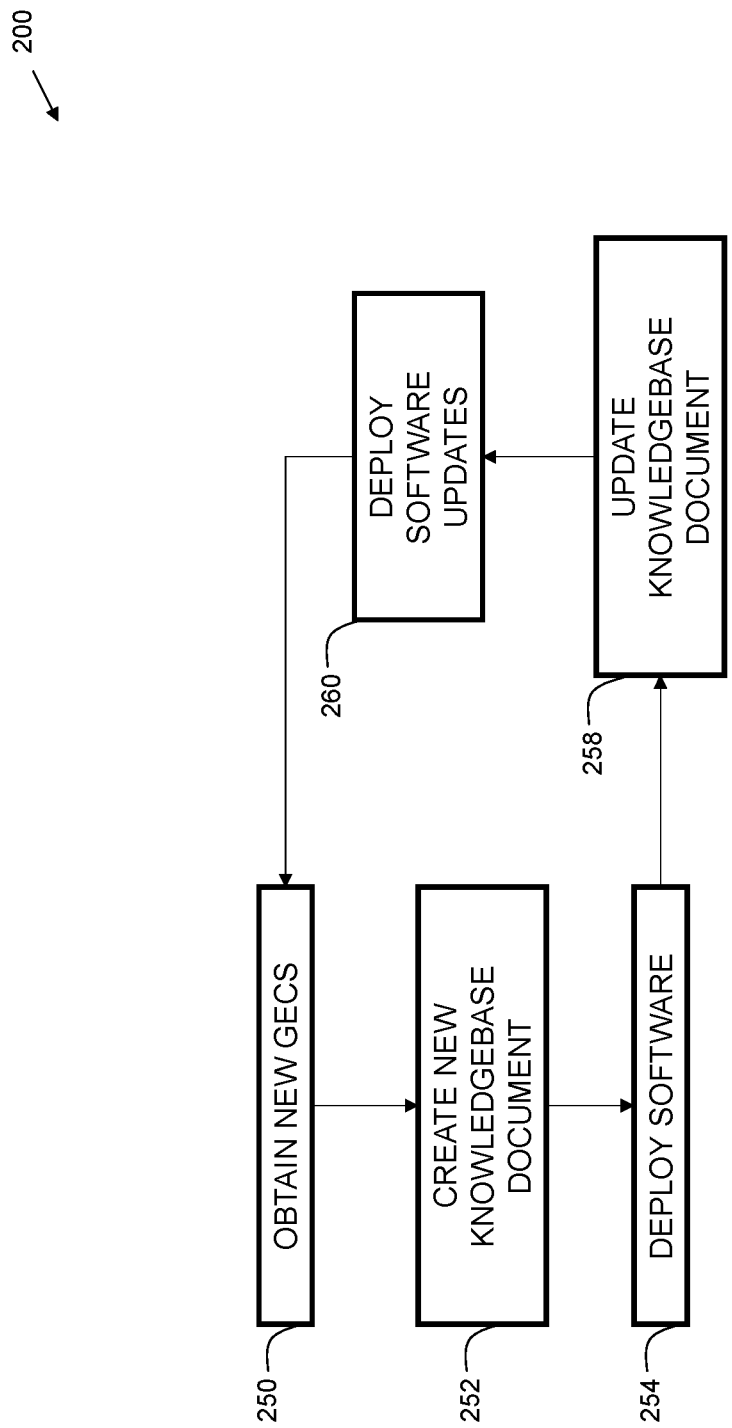
FIG. 2 is a flowchart indicating process steps for embodiments of the present invention.

FIG. 2 is a flowchart 200 indicating process steps for embodiments of the present invention. In embodiments, these steps may be used by software developers. At 250, a new GECS is obtained. In embodiments, this may be accomplished by invoking a control in an IDE, invoking a control on a webpage, or other mechanism to invoke an API such as an HTTP API, SOAP API, or other RESTful API. At 252, a new knowledgebase document is created, and associated with the GECS. At 254, software containing the GECS obtained at 250 is deployed. The deploying can include committing source code containing the GECS to a code repository, such as a git archive. Upon committing the code, a trigger mechanism, such as a git hook, sends a message to the GECS system 102 include the GECS and an associated source code comment. The GECS system 102 then creates a new document in the knowledgebase 162 that is associated with the GECS. At some later time, the knowledgebase document 258 can be updated by developers, technical writers, support specialists, and/or other stakeholders. At 260, software updates are deployed. As software updates are deployed, the process repeats as needed, ensuring that the knowledgebase information is well-correlated to the error codes used in the application software.

Figure 3:
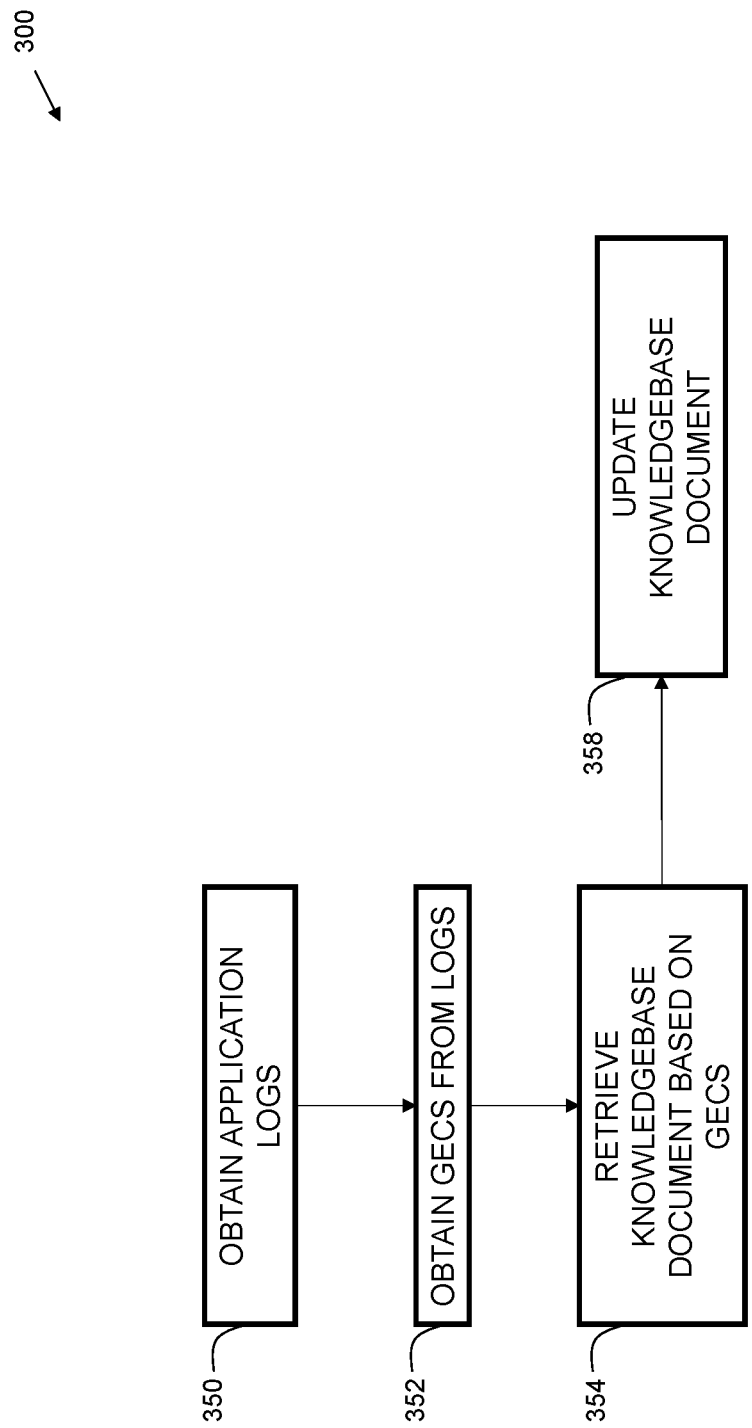
FIG. 3 is a flowchart indicating additional process steps for embodiments of the present invention.

FIG. 3 is a flowchart 300 indicating additional process steps for embodiments of the present invention. In embodiments, these steps may be used by application support specialists. At 350, application logs are obtained. These may be obtained from log aggregation system 168, directly from deployed devices and/or applications, or from another suitable source. At 352, GECS found in the logs are obtained. In embodiments, this can be performed using text parsing, including string searches and/or regular expression (regex) processing. At 354, the knowledgebase document corresponding to the GECS is retrieved. This allows an application support specialist to quickly access the needed information in order to diagnose and/or resolve the issue. If necessary, at 358, the knowledgebase document can be updated with new information pertaining to the diagnosis and/or resolution of the issue.

FIG. 4 is a flowchart 400 indicating additional process steps for embodiments of the present invention. In embodiments, these steps may be used by end-users of an application. At 450, an error message is obtained. In embodiments, this may be rendered on a user interface in the form of a web page or other suitable user interface. At 452, a GECS is obtained from the error message. At 454, the corresponding knowledgebase document is retrieved from the knowledgebase, based on the GECS obtained at 452. If necessary, at 458, the knowledgebase document can be updated with user feedback pertaining to the diagnosis and/or resolution of the issue.

Figure 5A:
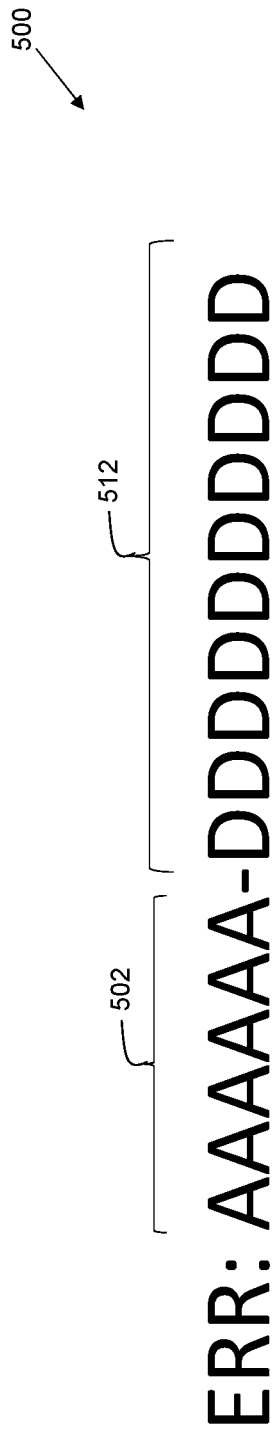
FIG. 5A shows a format of a global error code sequence in accordance with embodiments of the present invention.

FIG. 5A shows a format of a global error code sequence 500 in accordance with embodiments of the present invention. A first subset of characters 502 are associated with a particular organization. A second subset of characters 512 are used as error codes within the organization specified by the first subset of characters 502. As an example, Company A can be assigned company identifier of "3HGT87" by the GECS system 102. Company B can be assigned a company identifier of "OU8124" by the GECS system 102. Continuing with this example, two possible error codes assigned to Company A could be 3HGT87-98K76G36VF, and 3HGT87-98K7689KU2. Similarly, two possible error codes for Company B could be OU8124-765YB5SE42, and OU8124-98K76MK921. As can be noted from these examples, a first part of the GECS remains constant for a given company, while a second part of the GECS varies with each error, to make each GECS unique.

Figure 5B:
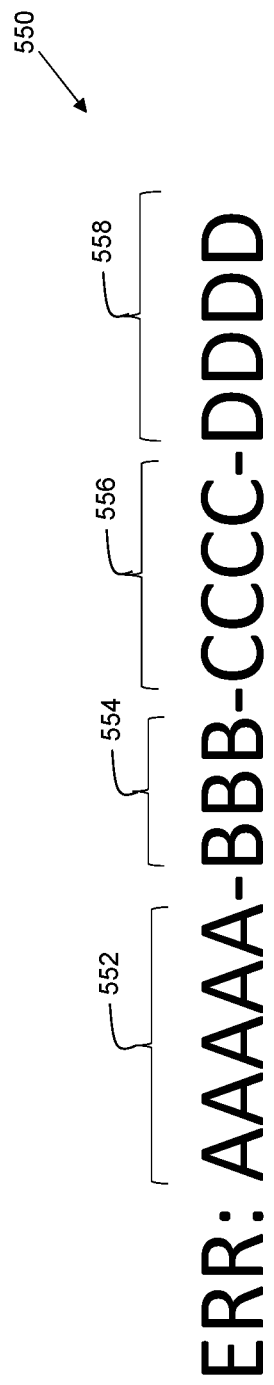
FIG. 5B shows a format of a global error code sequence in accordance with additional embodiments of the present invention.

FIG. 5B shows a format of a global error code sequence 550 in accordance with additional embodiments of the present invention. A first subset of characters 552 are associated with a particular organization. A second subset of characters 554 are associated with a particular division within the organization. A third subset of characters 556 are associated with a particular product sold by the division. A fourth subset of characters 558 are used for error codes pertaining to the product. In this way, a hierarchical scope is embedded into the GECS, making for improved organization and management of GECS data. The GECS can be numeric codes, alphanumeric codes, and/or symbolic codes, in some embodiments.

FIG. 6A shows an integrated development environment (IDE) 600 in the process of obtaining a global error code sequence (GECS). Column 602 indicates line numbers for the code displayed in the code panel 603. At line 10, an error statement is partially entered. When a cursor 610 is moved over the line containing the word "Error" 604, a tool tip 612 appears instructing the developer to right click a mouse button to obtain a GECS, which is a new unique error code that can be automatically inserted into software source code. FIG. 6B shows an integrated development environment (IDE) after insertion of the global error code sequence (GECS) into software source code. In FIG. 6B, at line 10, a GECS "Err-20TZ-5679-1BQ8-3948" retrieved from the GECS system 102 is inserted. A comment is automatically inserted at line 11. The comment includes the GECS "Err-20TZ-5679-1BQ8-3948" indicated at 607, as well as placeholder text indicated at 611, "ENTER YOUR COMMENT HERE." Thus, embodiments can include automatically inserting the error code into software source code.

FIG. 6C shows an integrated development environment (IDE) after completion of comments for the global error code sequence (GECS) in the software source code. Referring to lines 11 and 12 of FIG. 6C, the developer has replaced the placeholder text with the comment text indicated at 613, "if calibration file is missing, the import module may not be running" which is relevant to the specific error logged at line 10. By incorporating the process of obtaining and inserting the GECS into an editor or IDE, it streamlines the process for developers, ensuring that they use unique error codes. Furthermore, the process encourages developers to use meaningful comments as they create software, thereby serving to improve overall software quality. In some embodiments, the IDE or code editor sends any comment that immediately follows a line containing a GECS code to the GECS system 102 for inclusion in the corresponding knowledgebase document. In some embodiments, the IDE loads a plugin to perform this functionality.

FIG. 7 is a knowledgebase document 700 in accordance with embodiments of the present invention. At 702, there is a field for the Global Error Code Sequence (GECS). At 704, there is a field for the code comment. Note that the GECS and code comment may be extracted from source code, such as shown at lines 10-12 of FIG. 6C. Thus, in embodiments, the document includes text from the comment block.

At 706, there is an additional notes field. The additional notes field may contain additional details from a developer, technical support specialist, end-user, or other stakeholder that can be entered after the initial creation of document 700. At 708, there is a versions field that indicates which versions of software this knowledgebase document applies to. In some embodiments, this information may be automatically inserted by the GECS system 102 by querying the DevOps systems 138 to determine which branches of code the GECS is included in. Thus, embodiments can include determining one or more software releases associated with the error code, and updating the document in the knowledge management system corresponding to the error code with names of the one or more software releases.

At 710, there is a field for the author of the knowledgebase document. In embodiments, the author is the person that creates the additional notes section 706. Thus, embodiments can include determining an author associated with the document; and updating the document in the knowledge management system corresponding to the error code with the author.

At 712, there is a field for the developer associated with the GECS indicated at 702. In embodiments, the developer is the software engineer that committed the code change that introduced the GECS into the code repository 171. Thus, embodiments can include determining a developer associated with the source code; and updating the document in the knowledge management system corresponding to the error code with the developer.

FIG. 8 is a user interface 800 from an application in accordance with embodiments of the present invention. In embodiments, the user interface 800 shows an error message 802. Error message 802 may be rendered on an HTML page that is displayed on end-user device 116. The user interface may further include a control 804, such as a button, to obtain additional information. The additional information can include some or all of the content from the knowledgebase document 700. In this way, the end-user can quickly obtain relevant information for diagnosis, mitigation, and workarounds for errors encountered while using an application. In some embodiments, the end-user may be provided the capability to provide feedback into the knowledgebase document. In this way, a crowdsourced knowledgebase is facilitated to capture observations and techniques from end-users, and associate them to a specific GECS, thereby improving the overall value and effectiveness of the knowledgebase.

FIG. 9 is a java code example 900 in accordance with embodiments of the present invention. At 902, line 15 of a java source code file is indicated. At 904, line 21 of the java source code file is indicated. Line 15 includes a log statement that includes a GECS 905 in accordance with embodiments of the present invention. Line 21 includes a conventional log statement. Resultant logging from the log statements at lines 15 and 21 are shown in detail in FIG. 10A-10C.

FIG. 10A is a first logging example 1000. In this example, a logging entry indicated at 1002 is based on the logging statement at line 21 of FIG. 9. FIG. 10B is a second logging example 1010. As is very common in software development, code is often added or deleted in source code files, changing the line numbering in the source code file. The logging entry indicated at 1012 is for a different version of the file shown in FIG. 9, that alters the line numbering. A shortcoming of this approach is that knowledgebase documents based on the signature "NoColorException . . . . House.java: line 21" may not get invoked based on the logging entry at 1012, which has a different line number indicated (line 26). A similar problem occurs with call stacks that show address information, which can change when software updates occur.

FIG. 10C is a logging example 1020 utilizing embodiments of the present invention. In this example, a logging entry indicated at 1022 is based on the logging statement at line 15 of FIG. 9. FIG. 10D is another logging example 1030 utilizing embodiments of the present invention. As is very common in software development, code is often added or deleted in source code files, changing the line numbering in the source code file. The logging entry indicated at 1032 is for a different version of the file shown in FIG. 9, that alters the line numbering. As shown at 1032, the line number is indicated as line 33, compared with line 15 as indicated at 1022 of FIG. 10C. Since a GECS is used in the error logging, and because the GECS is guaranteed to be unique in scope, the proper knowledgebase document can be retrieved, regardless of source code line changes. Furthermore, even significant refactoring where the error code is moved to another class, function, and/or file, still continues to be associated with the proper knowledgebase document based on the use of the unique GECS, thereby significantly improving software maintainability and software supportability.

Figure 11:
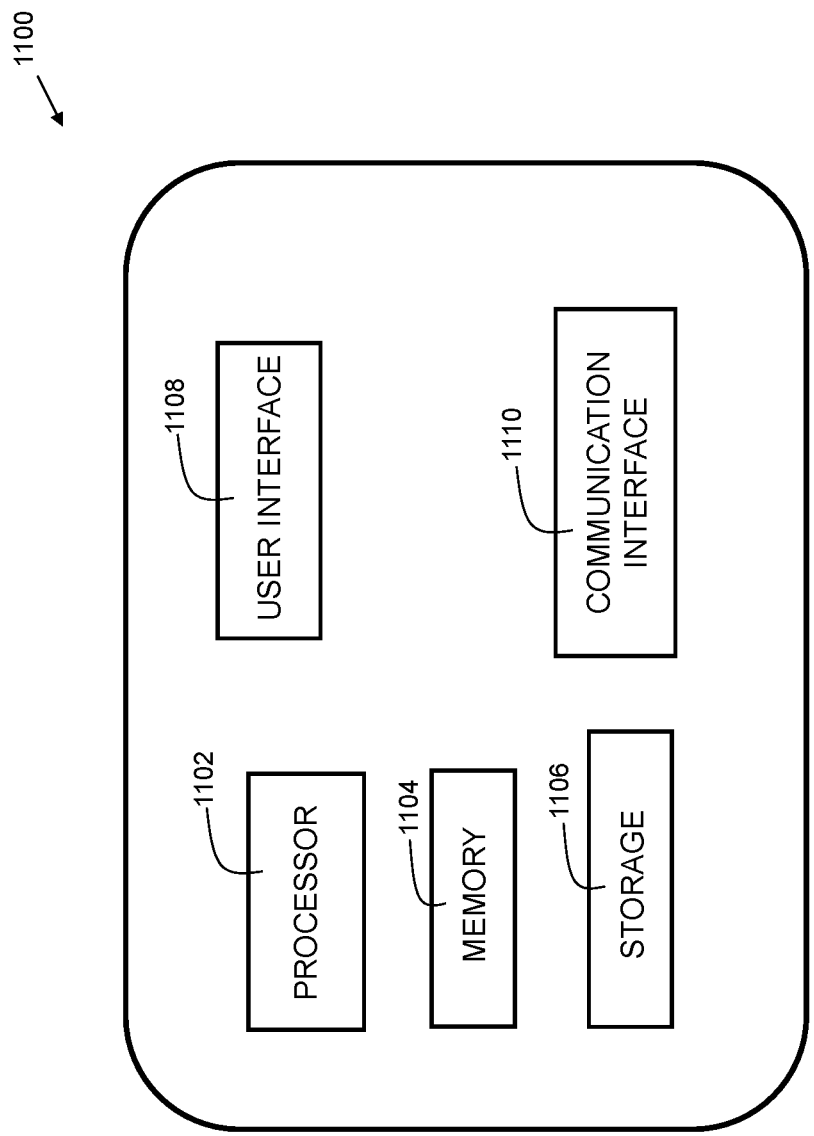
FIG. 11 is a block diagram of a client device in accordance with embodiments of the present invention.

FIG. 11 shows a block diagram of a client device 1100 in accordance with disclosed embodiments. In embodiments, this may represent an end-user electronic device such as 116 of FIG. 1. Device 1100 includes a processor 1102, which is coupled to a memory 1104. Memory 1104 may include dynamic random-access memory (DRAM), static random-access memory (SRAM), magnetic storage, and/or a read only memory such as flash, EEPROM, optical storage, or other suitable memory. In some embodiments, the memory 1104 may not be a transitory signal per se.

Device 1100 may further include storage 1106. In embodiments, storage 1106 may include one or more magnetic storage devices such as hard disk drives (HDDs). Storage 1106 may additionally include one or more solid state drives (SSDs).

Device 1100 may, in some embodiments, include a user interface 1108. This may include a display, keyboard, or other suitable interface. In some embodiments, the display may be touch-sensitive.

The device 1100 further includes a communication interface 1110. The communication interface 1110 may include a wireless communication interface that includes modulators, demodulators, and antennas for a variety of wireless protocols including, but not limited to, Bluetooth™, Wi-Fi, and/or cellular communication protocols for communication over a computer network. In embodiments, instructions are stored in memory 1104. The instructions, when executed by the processor 1102, cause the electronic computing device 1100 to execute operations in accordance with disclosed embodiments. These operations can include obtaining error messages, GECS, retrieval of knowledgebase documents based on the GECS, and/or providing user feedback to the knowledgebase, that is associated with the retrieved GECS.

Figure 12:
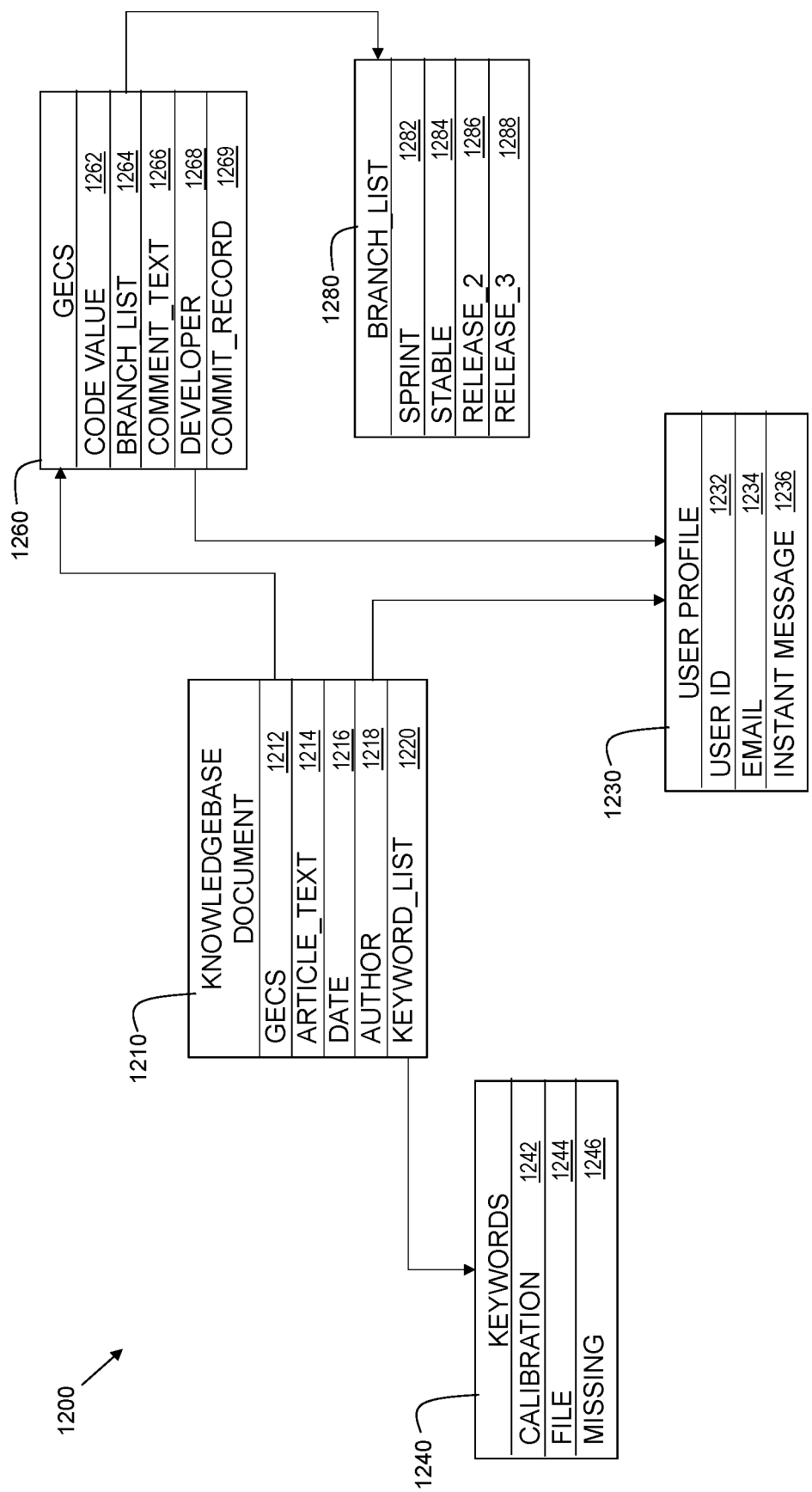
FIG. 12 shows data structures in accordance with embodiments of the present invention.

FIG. 12 shows an example 1200 of data structures in accordance with embodiments of the present invention. At 1210, there is a data structure for a knowledgebase document. Data structure 1210 may include a field 1212 for a GECS. Data structure 1210 may further include a field 1214 for article text. Data structure 1210 may further include a field 1216 for a date. In embodiments, the field 1216 may include a creation date and/or a last-modified date. Data structure 1210 may further include a field 1218 for an author of the knowledgebase document. Data structure 1210 may further include a field 1220 for a list of keywords pertaining to the knowledgebase document. In some embodiments, some or all of the keywords may be provided by the author or other stakeholder. In some embodiments, some or all of the keywords may be provided by machine learning system 122, utilizing natural language processing, entity detection, and/or other text processing techniques. In embodiments, the keywords list can be used to enable the knowledgebase to provide semantically similar documents to the one associated with the GECS, to further enhance diagnostic and mitigation capabilities.

At 1260, there is a data structure for a global error code sequence (GECS). Data structure 1260 may include a field 1262 for a code value (such as shown at 607 of FIG. 6B). Data structure 1260 may further include a field 1264 for a branch list. The branch list can include a list of software version control branches (e.g. via git, cvs, svn, etc.) that include source code having the GECS code value indicated at 1262. Data structure 1260 may further include a field 1266 for comment text (such as shown at 613 of FIG. 6C). Thus, embodiments can include receiving updated text for the comment block, and updating the document in the knowledge management system corresponding to the error code with the updated text.

Data structure 1260 may further include a field 1268 for a developer that requested the GECS code value indicated at 1262. Data structure 1260 may further include a field 1269 for a commit record pertaining to the GECS code value indicated at 1262. In embodiments, the commit record may include a unique value that is obtained from the DevOps system 138, and may be used to determine various metadata pertaining to the GECS, such as date requested, date(s) committed to one or more branches, developers, defect ticket information, change history, and/or other relevant data.

At 1280, there is a data structure for a branch list. Data structure 1280 may include one or more entries for various branches (indicated as 1282, 1284, 1286, and 1288) in which the GECS is committed. While four entries are shown in the example of FIG. 12, in practice, the branch list data structure 1280 can have more or fewer entries. The information shown in fields 1282, 1284, 1286, and 1288 is exemplary, and other embodiments may utilize different values in those fields.

At 1230, there is a data structure for a user profile. The user profile data structure 1230 can contain information about an author, developer, or other stakeholder. Data structure 1230 may include a field 1232 for a user identifier such as a username. Data structure 1230 may further include a field 1234 for an email address associated with the user identifier indicated at 1232. Data structure 1230 may further include a field 1236 for an instant message handle associated with the user identifier indicated at 1232. This information may be used in a knowledgebase document to allow convenient contact of subject matter experts when reviewing a knowledgebase document.

At 1240, there is a data structure for keywords. Data structure 1240 may include one or more entries for various keywords associated with a knowledgebase document, (indicated as 1242, 1244, and 1246). In embodiments, some or all of the keywords may be provided by machine learning system 122, utilizing natural language processing, entity detection, concordance processing, and/or other text processing techniques. While three keywords, ('calibration' 1242, 'file' 1244, and 'missing' 1246) are shown in the example of FIG. 12, in practice, the keywords data structure 1240 can have more or fewer entries. The information shown in fields 1242, 1244, and 1246 is exemplary, and other embodiments may utilize different values in those fields.

As can now be appreciated, disclosed embodiments provide improved computer system application development and deployment. By creating a global error code sequence (GECS) that is seamlessly incorporated into an integrated development environment (IDE) and linked with a knowledgebase, it enables technical information associated with software errors and warnings to be closely coupled to each other, even if details such as line numbers and addresses change. Disclosed embodiments can be used with a wide variety of languages, including, but not limited to, Python, Java, C, C++, C#, Ruby, and/or other programming languages now known, or hereinafter developed. Additionally, disclosed embodiments can utilize RPA-based automation to achieve auto-remediation of errors. The unique error codes generated by disclosed embodiments guarantee the strong link between the exception handling sequence and the error code. Furthermore, disclosed embodiments provide the advantage of enforcing unique error code generation at development time (e.g., via an IDE plugin), thus avoiding duplicate error codes/messages being logged at runtime. Disclosed embodiments guarantee that the unique error code is used across the code base and that new error codes are introduced seamlessly, as needed, when the source code changes. Support engineers can rely on these unique error codes to find the corresponding knowledge document and apply corrective actions. Thus, disclosed embodiments improve the technical field of software application diagnosis and ensures that the management of error codes works well at scale, with large code bases and disjoined teams of developers and support engineers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a request for a unique error code from a remote computing device;
generating a new unique error code;
transmitting the new unique error code to the remote computing device;
automatically generating a document in a knowledge management system corresponding to the new unique error code; and
automatically inserting the new unique error code into software source code.

2. The method of claim 1, further comprising, automatically creating a comment block in the software source code, wherein the comment block includes the error code.

3. The method of claim 2, wherein the document includes text from the comment block.

4. The method of claim 3, further comprising:
receiving updated text for the comment block; and
updating the document in the knowledge management system corresponding to the new unique error code with the updated text.

5. The method of claim 3, further comprising:
determining one or more software releases associated with the new unique error code; and
updating the document in the knowledge management system corresponding to the new unique error code with names of the one or more software releases.

6. The method of claim 3, further comprising:
determining an author associated with the document; and
updating the document in the knowledge management system corresponding to the new unique error code with the author.

7. The method of claim 3, further comprising:
   determining a developer associated with the software source code; and
   updating the document in the knowledge management system corresponding to the new unique error code with the developer.

8. An electronic computation device comprising:
   a processor;
   a memory coupled to the processor, the memory containing instructions, that when executed by the processor, cause the electronic computation device to:
   receive a request for a unique error code from a remote computing device;
   generate a new unique error code;
   transmit the new unique error code to the remote computing device;
   automatically generate a document in a knowledge management system corresponding to the new unique error code; and
   automatically insert the new unique error code into software source code.

9. The electronic computation device of claim 8, wherein the memory further comprises instructions, that when executed by the processor, cause the electronic computation device to automatically create a comment block in the software source code, wherein the comment block includes the new unique error code.

10. The electronic computation device of claim 9, wherein the memory further comprises instructions, that when executed by the processor, cause the electronic computation device to include text from the comment block in the document.

11. The electronic computation device of claim 10, wherein the memory further comprises instructions, that when executed by the processor, cause the electronic computation device to:
    determine one or more software releases associated with the new unique error code; and
    update the document in the knowledge management system corresponding to the new unique error code with names of the one or more software releases.

12. A computer program product for an electronic computation device comprising a computer readable storage medium, which is not a signal, having program instructions embodied therewith, the program instructions executable by a processor to cause the electronic computation device to:
    receive a request for a unique error code from a remote computing device;
    generate a new unique error code;
    transmit the new unique error code to the remote computing device;
    automatically generate a document in a knowledge management system corresponding to the new unique error code; and
    automatically insert the new unique error code into software source code.

13. The computer program product of claim 12, wherein the computer program product further includes program instructions, that when executed by the processor, cause the electronic computation device to automatically create a comment block in the software source code, wherein the comment block includes the new unique error code.

14. The computer program product of claim 13, wherein the computer program product further includes program instructions, that when executed by the processor, cause the electronic computation device to include text from the comment block in the document.

15. The computer program product of claim 13, wherein the computer program product further includes program instructions, that when executed by the processor, cause the electronic computation device to:
    determine one or more software releases associated with the new unique error code; and
    update the document in the knowledge management system corresponding to the new unique error code with names of the one or more software releases.

16. The computer program product of claim 13, wherein the computer program product further includes program instructions, that when executed by the processor, cause the electronic computation device to:
    determine a developer associated with the source code; and
    update the document in the knowledge management system corresponding to the new unique error code with the developer.

17. The computer program product of claim 13, wherein the computer program product further includes program instructions, that when executed by the processor, cause the electronic computation device to:
    determine an author associated with the document; and
    update the document in the knowledge management system corresponding to the new unique error code with the author.

* * * * *